US008903550B2

(12) United States Patent
Lee et al.

(10) Patent No.: US 8,903,550 B2
(45) Date of Patent: Dec. 2, 2014

(54) GRIPPER OF ROBOT AND METHOD FOR CONTROLLING THE SAME

(71) Applicant: Hyundai Motor Company, Seoul (KR)

(72) Inventors: Seok Won Lee, Chungcheongnam-do (KR); Woo Sung Yang, Seoul (KR)

(73) Assignee: Hyundai Motor Company, Seocho-ku, Seoul (KR)

( * ) Notice: Subject to any disclaimer, the term of this patent is extended or adjusted under 35 U.S.C. 154(b) by 87 days.

(21) Appl. No.: 13/846,902

(22) Filed: Mar. 18, 2013

(65) Prior Publication Data

US 2014/0188277 A1    Jul. 3, 2014

(30) Foreign Application Priority Data

Dec. 27, 2012   (KR) ........................ 10-2012-0154474

(51) Int. Cl.
     *B25J 15/00*      (2006.01)
     *B25J 9/16*      (2006.01)
     *B25J 13/08*      (2006.01)

(52) U.S. Cl.
CPC ............ *B25J 9/1674* (2013.01); *B25J 15/0052* (2013.01); *Y10S 901/31* (2013.01); *Y10S 901/46* (2013.01); *B25J 13/082* (2013.01); *B25J 15/0033* (2013.01)
USPC .................. 700/258; 700/1; 700/245; 901/31; 901/46

(58) Field of Classification Search
CPC .... G06N 3/008; A61B 19/22; A61B 19/5212; B25J 13/085; G05B 2219/45083
See application file for complete search history.

(56) References Cited

U.S. PATENT DOCUMENTS

| | | | |
|---|---|---|---|
| 2009/0060684 A1* | 3/2009 | Nakamoto | 414/1 |
| 2009/0143787 A9* | 6/2009 | de la Pena | 606/130 |
| 2010/0130111 A1* | 5/2010 | Horiguchi et al. | 451/262 |
| 2010/0270480 A1* | 10/2010 | Echner | 250/492.1 |
| 2011/0067517 A1* | 3/2011 | Ihrke et al. | 74/490.03 |
| 2011/0230894 A1* | 9/2011 | Simaan et al. | 606/130 |
| 2012/0279343 A1* | 11/2012 | Ihrke et al. | 74/490.03 |

FOREIGN PATENT DOCUMENTS

| | | |
|---|---|---|
| JP | 08155868 | 6/1996 |
| JP | 2512327 B2 | 7/1996 |
| KR | 100648449 B1 | 11/2006 |
| KR | 2012-0069923 A | 6/2012 |

OTHER PUBLICATIONS

Korean Office Action issued in Application No. 10-2012-0154474 dated Dec. 16, 2013.

* cited by examiner

*Primary Examiner* — Ian Jen
(74) *Attorney, Agent, or Firm* — McDermott Will & Emery LLP

(57) ABSTRACT

A robot gripper is provided comprising two robot arms, upper contact parts, and lower contact parts disposed at the ends of each of the two robot arms. The upper and lower contact parts are in contact with a top and a bottom of an article when gripping the article, The upper and lower contact parts are semispherical shaped and have predetermined radii. Sensor units are mounted on the upper contact parts and the lower contact parts. The sensor units measure vertical or horizontal forces applied to the upper contact parts or the lower contact parts when gripping the article. A control unit configured to determine whether the center of gravity of the article is located at a center position between the ends of the arms using vertical and horizontal distances between the ends of the arms and vertical components of the forces measured by the sensor units when gripping the article is provided.

7 Claims, 4 Drawing Sheets

GRIPPER OF ROBOT AND METHOD FOR CONTROLLING THE SAME

CROSS-REFERENCE TO RELATED APPLICATION

This application claims under 35 U.S.C. §119(a) the benefit of priority to Korean Patent Application No. 10-2012-0154474, filed Dec. 27, 2012, the entire contents of which are incorporated herein by reference.

TECHNICAL FIELD

The present disclosure relates to a robot gripper that can determine stability by calculating the distance from the center of gravity of an article to be lifted to the contact points of the arms with a 2-axial sensor mounted on a gripper, selecting new contact points, repeating the gripping of the article, and calculating the vertical component of a force and the horizontal component of the force, when operating on an unknown object of which the center of gravity is not known, and a method of controlling the robot gripper.

BACKGROUND

Robot grippers are used to grip and move articles. Two armed robots attempt to grip and lift articles with the center of gravity of the article located in a center position between the arms. Robot grippers, however have difficulty in holding heavy or long articles with stability. Robots that are used to grip an article in industry, may cause an accident by slipping and dropping the article. Therefore it was necessary to develop a method that can determine stability during gripping, such as by using a sensor while gripping in order to preclude such an accident.

KR10-2012-0069923 A, titled "WALKING ROBOT AND METHOD FOR CONTROLLING BALANCING THE SAME" discloses a walking robot and a method for controlling balance of the robot for controlling the stable balance of a walking robot that operates the joints with a torque servo. It is possible to keep an erect posture and a desired upper body angle even under external changes including any force form the outside and the degree of inclination of the ground, by calculating virtual gravitational acceleration, using the centers of gravity of a robot, and calculating gravitational compensation torque for applying a force to a link from the calculated virtual gravitational acceleration. Further, a robot can keep the erect posture with respect to the gravitational direction even under conditions without information about the inclination direction and the degree of inclination of the ground, and can keep the posture of the upper body and the legs stable while changing the angles of the ankle joints even if the ground where the robot stands gradually inclines. However, it was difficult to evaluate the stability in gripping an unknown object even using the method, therefore such a technology is necessarily required for the robots in the industrial fields.

The description provided above is a related art of the present disclosure for helping understanding the background of the present disclosure.

SUMMARY

According to an embodiment of the present disclosure, a robot gripper is provided comprising two robot arms, upper contact parts, and lower contact parts disposed at the ends of each of the two robot arms. The upper and lower contact parts are in contact with a top and a bottom of an article when gripping the article, The upper and lower contact parts are semispherical shaped and have predetermined radii. Sensor units are mounted on the upper contact parts and the lower contact parts. The sensor units measure vertical or horizontal forces applied to the upper contact parts or the lower contact parts when gripping the article. A control unit configured to determine whether the center of gravity of the article is located at a center position between the ends of the arms using vertical and horizontal distances between the ends of the arms and vertical components of the forces measured by the sensor units when gripping the article is provided.

According to another embodiment of the present disclosure, a method of controlling a robot gripper is provided. The robot gripper comprises two robot arms, upper contact parts, and lower contact parts disposed at the ends of each of the two robot arms. The upper and lower contact parts contact with a top and a bottom of an article when gripping, The upper and lower contact parts are semispherical shaped and have predetermined radii. Sensor units are mounted on the upper contact parts and the lower contact parts. The sensor units measure vertical or horizontal forces applied to the upper contact parts or the lower contact parts when gripping the article. A control unit configured to determine whether the center of gravity of the article is located at a center position between the ends of the arms using vertical and horizontal distances between the ends of the arms and vertical components of the forces measured by the sensor units when gripping the article is provided. The method comprises gripping an article and measuring an inclination angle of the article from the vertical and horizontal distances of the ends of the arms. The horizontal distances to the ends of the arms from the center of gravity of the article is calculated using the inclination angle of the article and the vertical components of the forces measured by the sensor units.

The present disclosure has been made in an effort to solve the problems and an object of the present disclosure is to provide a robot gripper that can determine stability by calculating the distance from the center of gravity of an article to the contact points with a 2-axial sensor mounted on a gripper, selecting new contact points, repeating gripping and calculating the distance from the center of gravity, and calculating the vertical component of a force and the horizontal component of the force, when operating on an object for which the center of gravity is not known. Another object of the present disclosure is a method of controlling the robot gripper.

In certain embodiments of the present disclosure, the control unit determines friction forces between the article and the upper contact parts or the lower contact parts and compares the friction forces with the horizontal components of the force, when the center of gravity is not located at a center position between the ends of the arms.

In certain embodiments of the present disclosure, a method of controlling a robot gripper of the present disclosure includes: gripping an article; measuring the inclination angle of the article from the vertical and horizontal distances of the ends of the arms; and calculating the horizontal distances to the ends of the arms from the centers of gravity of the article, using the inclination angle of the article and the vertical components of the forces measured by the sensor units.

In certain embodiments, the calculating further includes determining whether the horizontal forces are identical.

In certain embodiment, the determining further includes calculating friction forces exerted between the article and the upper contact parts or the lower contact parts when the horizontal distances are not identical.

In certain embodiments, the calculating determines the vertical and the horizontal components of the forces using the inclination angle of the article and the vertical and horizontal components of forces measured by the sensor units, and extracts the friction forces using the vertical components of the forces.

In certain embodiments, the calculating further includes comparing the extracted friction forces with the horizontal components of the forces.

BRIEF DESCRIPTION OF THE DRAWINGS

The foregoing and other features of the present disclosure will be apparent from more particular description of embodiments of the present disclosure, as illustrated in the accompanying drawings in which like reference characters may refer to the same or similar parts throughout the different views. The drawings are not necessarily to scale, emphasis instead being placed upon illustrating the principles of the embodiments of the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

DETAILED DESCRIPTION

A robot gripper and a method of controlling the robot gripper according to an embodiment of the present disclosure are described hereafter with reference to the accompanying drawings.

Figure 1:
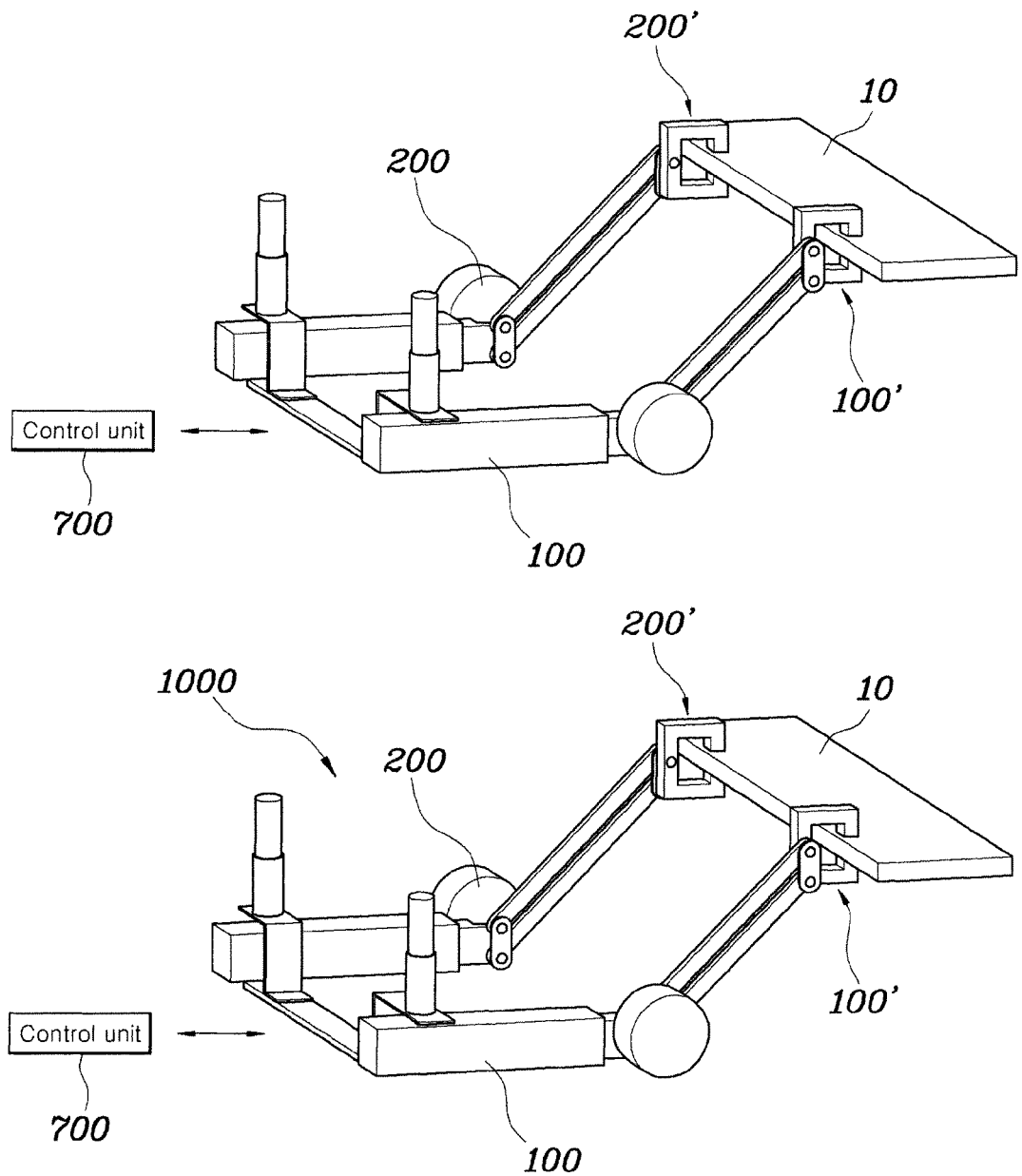
FIG. 1 is a view showing the configuration of a robot gripper according to an embodiment of the present disclosure.
Figure 2:
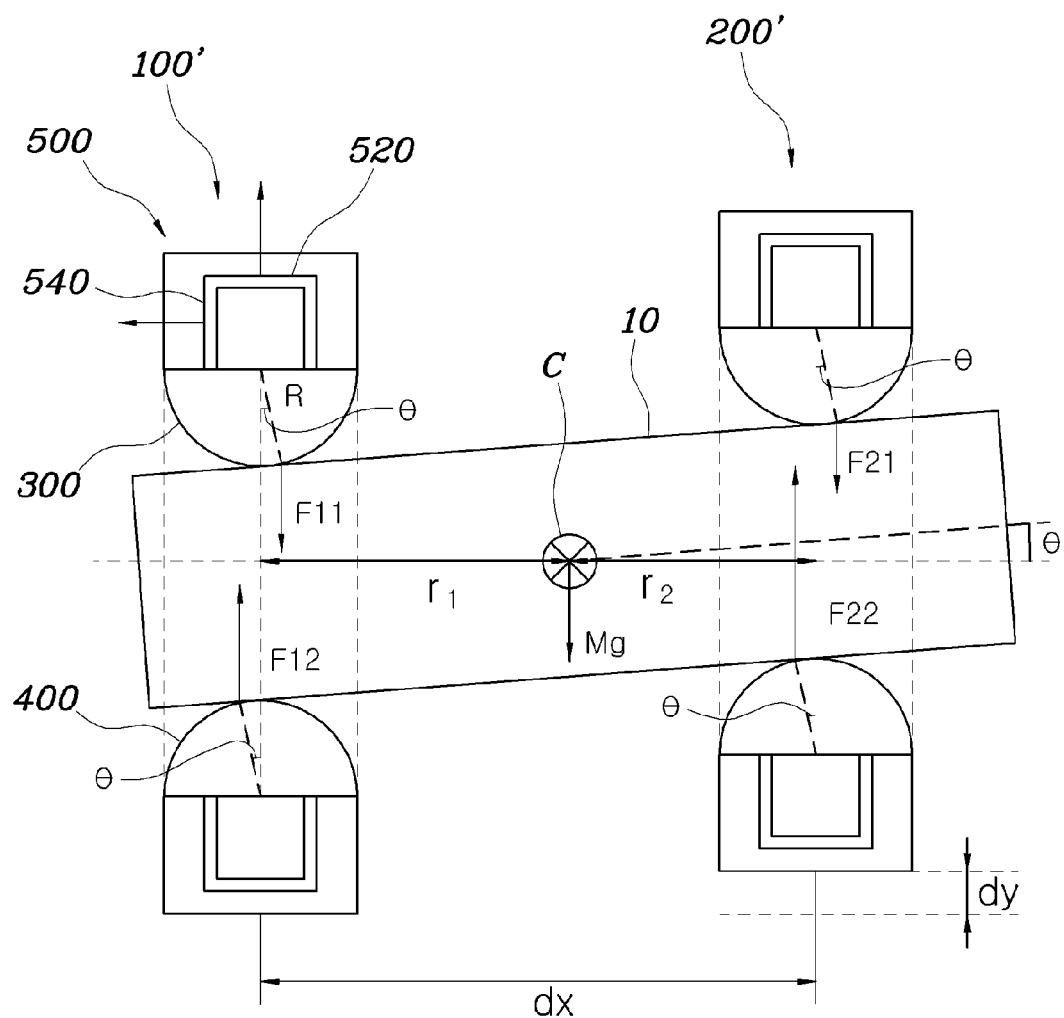
FIGS. 2 to 3 are views illustrating a method of controlling a robot gripper according to an embodiment of the present disclosure.
Figure 3:
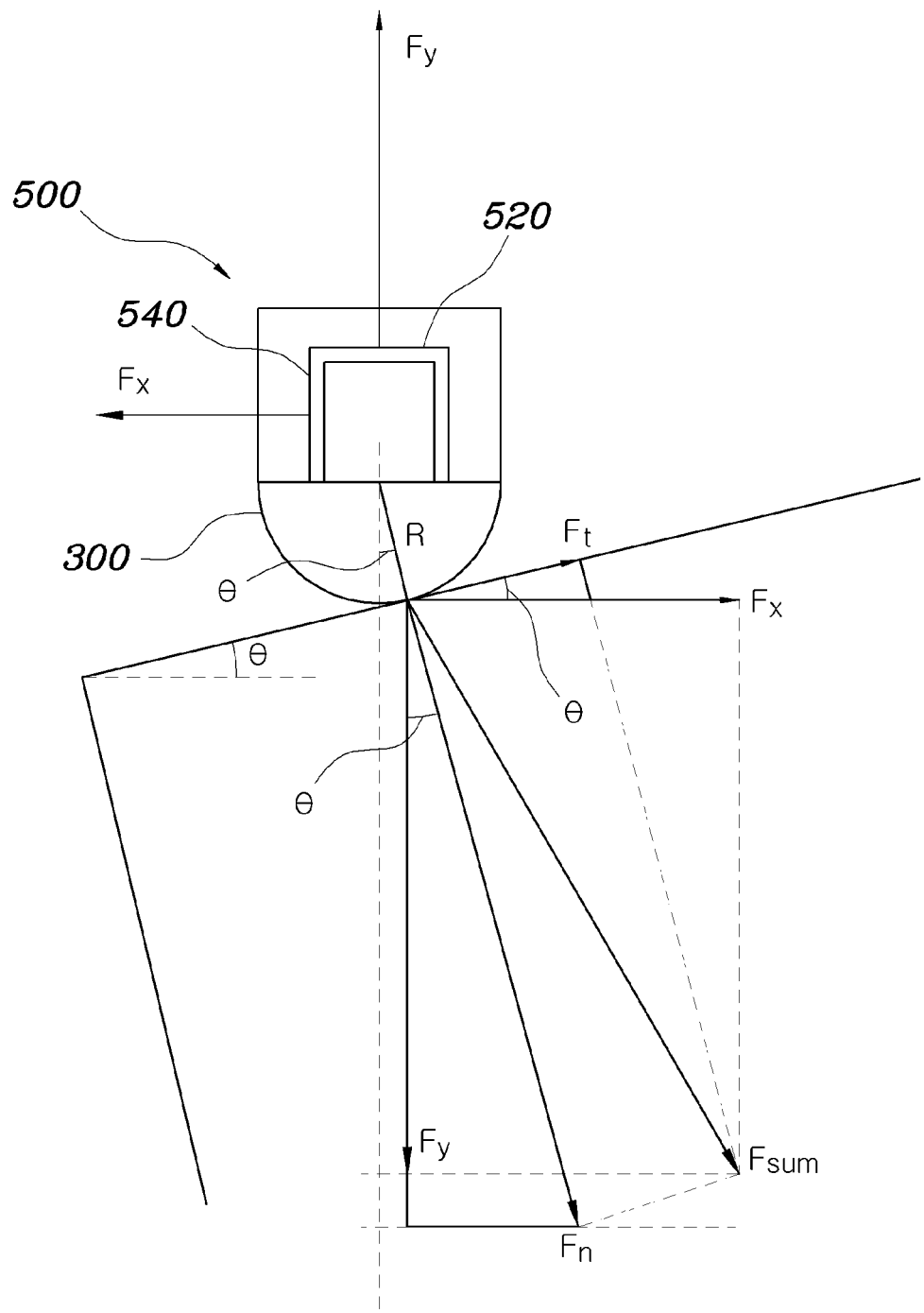
Figure 4:
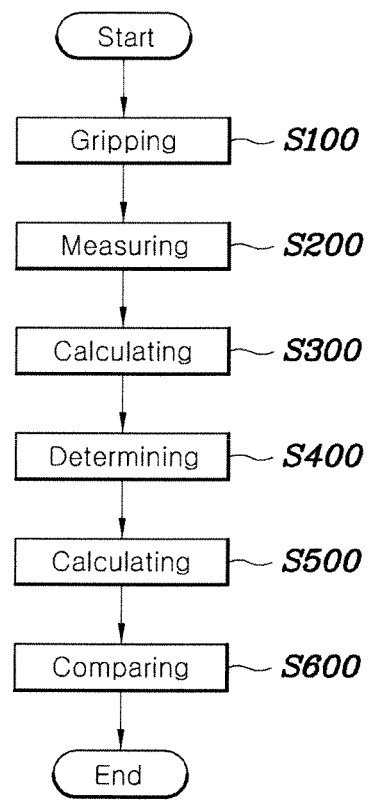
FIG. 4 is a flowchart illustrating a method of controlling a robot gripper according to an embodiment of the present disclosure.

FIG. 1 is a view showing the configuration of a robot gripper according to an embodiment of the present disclosure, FIGS. 2 to 3 are views illustrating a method of controlling a robot gripper according to an embodiment of the present disclosure, and FIG. 4 is a flowchart illustrating a method of controlling a robot gripper according to an embodiment of the present disclosure.

As shown in FIG. 2, a robot gripper according to an embodiment of the present disclosure includes: upper contact parts 300 and lower contact parts 400 that are disposed at the ends 100', 200' of two robot arms 100, 200 (see FIG. 1). The upper and lower contact parts 300, 400 come into contact with the top and the bottom of an article 10 when gripping. The upper and lower contact parts 100', 200' are substantially semispherical shaped having predetermined radii. Sensor units 500 are mounted on the upper contact parts 300 and the lower contact parts 400 and measure vertical or horizontal forces applied to the upper contact parts 300 or the lower contact parts 400 when gripping the article 10. A control unit 700 is configured to determine whether the center of weight C of the article 10 is located at a center position between the ends 100' and 200' of the arms, using vertical and horizontal distances dx and dy between the ends 100' and 200' of the arms and the vertical components of the forces measured by the sensor units 500 in gripping the article 10.

FIG. 1 shows a robot gripper 1000 according to an embodiment of the present disclosure. The robot gripper 1000 of the present disclosure can be used for gripping and lifting a heavy article with two arms. Further, the robot gripper 1000 may be used for a wearable robot.

In certain embodiments of the present disclosure, a gripper is mounted on the ends 100' and 200' of the arms 100 and 200 of a robot (not shown). The gripper simultaneously grips and holds the top and the bottom of the article 10 from above and below, and lifts the article 10. However, if the article 10 is not positioned at the center position between the arms 100, 200 or becomes inclined in during the lifting process, the article may slide and drop or it may become easily separated by an external force after lifted, which may cause an accident.

According to embodiments of the present disclosure, the gripper can be guided to grip the article again when it is determined that the article is not in a safe position by determining the stability of the article in advance of lifting the article. Further, it is also possible to implement a logic that can determine the weight of an unknown article.

To achieve these objectives, the robot gripper according to embodiments of the present disclosure include the upper contact parts 300 and the lower contact parts 400 that are mounted on the ends 100', 200' of the robot arms 100, 200, respectively, that come in contact with the top and the bottom of the article 10 when gripping, and have semispherical shapes with predetermined radii.

According to certain embodiments, the upper contact parts 300 and the lower contact parts 400 of the gripper come into contact with the top and the bottom of the article 10, respectively. Further, the sensor units 500 are mounted on the upper contact parts 300 and the lower contact parts 400 and measure the vertical or horizontal forces applied to the upper contact parts 300 or the lower contact parts 400 in gripping the article 10. The sensor units 500 basically measure the vertical or horizontal forces applied to the upper contact parts 300 or the lower contact parts 400 by the article 10. In certain embodiments, the sensor unit is composed of a horizontal sensor 520 and a vertical sensor 540.

In certain embodiments of the present disclosure, a control unit 700 determines whether the center of weight C of the article 10 is positioned centrally between the ends 100' and 200' of the arms, using vertical and horizontal distances dx and dy between the ends 100' and 200' of the arms and the vertical components of the forces measured by the sensor units 500 in gripping the article 10, to determine stability.

In certain embodiments, the control unit 700 also secondarily determines the stability by determining friction forces between the article 10 and the upper contact parts 300 or the lower contact parts 400 and comparing the friction forces with the horizontal components of the force when the center of weight is not centrally positioned between the ends 100' and 200' of the arms.

FIG. 4, is a flowchart illustrating a method of controlling a robot gripper according to an embodiment of the present disclosure illustrated in FIGS. 2 and 3.

A method of controlling the robot gripper of the present disclosure includes: gripping an article S100; measuring the inclination angle of the article from the vertical and horizontal distances of the ends of the arms S200; calculating the horizontal distances to the ends of the arms from the center of gravity of the article, using the inclination angle of the article and the vertical components of the forces measured by the sensor units S300. As can be seen in FIG. 2, the center position of an article is determined. According to an embodiment of the present disclosure, the method performs the gripping of an article S100 and then performs the measuring of the inclination angle of the article from the vertical and horizontal distances of the ends of the arms S200.

If the article is inclined, the ends of the robot arms also incline at the same angle as the inclination angle, this is because the upper contact parts 300 and the lower contact parts 400 have semispherical surfaces with radii Rs, as described above.

According to certain embodiments, the inclination angle of an article can be determined by the trigonometric function of the vertical distance dy and the horizontal distance dx of the ends of the arms, as in the following equation.

$$\theta = \tan^{-1}(dy/dx) \qquad \text{[Equation 1]}$$

Further, the method performs the calculating of the horizontal distances to the ends of the arms from the center of weight of the article, using the inclination angle of the article and the vertical components of the forces measured by the sensor units S300.

The horizontal distances $r_1$ and $r_2$ from the center of gravity C of the article to the ends of the arms can be determined by the following equation.

$$\Sigma M_g = (r_1 - R \sin \theta) F_{11} - (r_1 + R \sin \theta) F_{12} - (r_2 - R \sin \theta) F_{22} = 0$$

$$r_1 + r_2 = dx \qquad \text{[Equation 2]}$$

As can be seen from Equation 2, the horizontal distances $r_1$ and $r_2$ from the center of gravity C of the article to the ends of the arms are calculated by finding two variables from two equations. That is, the equation showing that the sum of moments at the center of gravity C of the article is 0 is extracted from the vertical components $F_{11}$, $F_{12}$, $F_{21}$, and $F_{22}$ of the forces measured by the sensor units, the radii Rs of the upper contact parts 300 and the lower contact parts 400, and the variables $r_1$ and $r_2$, using a trigonometric function, and then $r_1 + r_2$ is calculated using two equations showing that horizontal distances dx are identical at the ends of the arms. The angle of inclination θ is determined in advance. After $r_1$ and $r_2$ are determined, the determination of whether the horizontal distances are identical is performed S400. When the horizontal distances $r_1$ and $r_2$ are identical, it is determined that the article is stably positioned at the center.

However, when $r_1$ and $r_2$ are not identical, that is, when the horizontal distances are not identical and the center of gravity of the article is not located at the center position between the arms, the friction forces between the article and the upper contact parts or the lower contact parts is calculated S500.

Further, the calculating step S500 determines the vertical and the horizontal components of the forces, using the inclination angle of the article and the vertical and horizontal components of forces measured by the sensor units, and extracts the friction forces, using the vertical components of the forces, and then comparing the extracted friction forces with the horizontal components of the forces is performed S600.

FIG. 3 illustrates the secondary determination, which is described with reference to the following equations.

$$F_t = (F_x - F_y \tan \theta) * \cos \theta$$

$$F_n = (F_y + F_t \sin \theta) / \cos \theta$$

$$F_t \leq \mu * F_n \qquad \text{[Equation 3]}$$

The inclination angle θ in these equations is determined in advance. Further, the forces $F_x$ and $F_y$ exerted between the upper contact part and the article are measured by the sensor unit 500 and the resultant force $F_{sum}$ is obtained from the forces. The resultant force is divided again into the vertical component $F_n$ of the force and the horizontal component of the force $F_t$ with respect to the article, using the inclination angle θ. Further, the friction force $\mu * F_n$ is obtained from the vertical component of the force and it is considered that the article does not slip when the horizontal component $F_t$ of the force is smaller than the friction force, thereby determining that the article is in a stable gripping state.

Therefore, when it is determined that the article is stable in the primary and secondary tests through the process, the gripper is guided to grip the article at new positions, so that the article may be stably lifted.

According to the robot gripper with the structure described above and the method of controlling the robot gripper, it is possible to calculate the weight of an unknown article and to calculate the distance from contact points to the center of gravity.

Therefore, it is possible to repeatedly position the article until the center of gravity of the article is located at a center position between the arms and to determine the stability of the gripped article by calculating the vertical/horizontal reacting forces at the contact points.

According to the robot gripper with the structure described above and the method of controlling the robot gripper, it is possible to calculate the weight of an unknown article and to calculate the distance from a contact point to the center of gravity.

Therefore, it is possible to securely operate by repeatedly positioning the article so that the center of gravity of the article is centered between the arms and to determine stability of gripped article by calculating the vertical/horizontal reacting forces at the contact points.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. A robot gripper comprising:
   two robot arms;
   upper contact parts and lower contact parts disposed at the ends of each of the two robot arms, wherein the upper and lower contact parts are in contact with a top and a bottom of an article when gripping the article, and
   the upper and lower contact parts are semispherical shaped having predetermined radii;
   sensor units mounted on the upper contact parts and the lower contact parts, wherein the sensor units measure vertical or horizontal forces applied to the upper contact parts or the lower contact parts when gripping the article; and
   a control unit configured to determine whether the center of gravity of the article is located at a center position between the ends of the arms using vertical and horizontal distances between the ends of the arms and vertical components of the forces measured by the sensor units when gripping the article.

2. The robot gripper of claim 1, wherein the control unit determines friction forces between the article and the upper contact parts or the lower contact parts and compares the friction forces with the horizontal components of the force, when the center of gravity is not located at the center position between the ends of the arms.

3. A method of controlling the robot gripper of claim 1, the method comprising:

gripping an article;

measuring an inclination angle of the article from the vertical and horizontal distances of the ends of the arms; and calculating the horizontal distances to the ends of the arms from the center of gravity of the article, using the inclination angle of the article and the vertical components of the forces measured by the sensor units.

4. The method of claim 3, wherein the calculating further includes determining whether the horizontal forces are identical.

5. The method of claim 4, wherein the determining further includes calculating friction forces exerted between the article and the upper contact parts or the lower contact parts, when the horizontal distances are not identical.

6. The method of claim 5, wherein the calculating determines the vertical and the horizontal components of the forces using the inclination angle of the article and the vertical and horizontal components of forces measured by the sensor units, and extracts the friction forces, using the vertical components of the forces.

7. The method of claim 6, wherein the calculating further includes comparing the extracted friction forces with the horizontal components of the forces.

\* \* \* \* \*